United States Patent
Chiang et al.

(10) Patent No.: US 11,800,393 B2
(45) Date of Patent: *Oct. 24, 2023

(54) CELL MAP BUILT AND USED BY MOBILE DEVICES

(71) Applicant: T-Mobile USA, Inc., Bellevue, WA (US)

(72) Inventors: Hsin Fu Henry Chiang, Bellevue, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/090,349

(22) Filed: Dec. 28, 2022

(65) Prior Publication Data

US 2023/0164611 A1     May 25, 2023

Related U.S. Application Data

(63) Continuation of application No. 16/693,065, filed on Nov. 22, 2019, now Pat. No. 11,546,789.

(51) Int. Cl.
*H04W 24/10* (2009.01)
*H04W 4/029* (2018.01)
(Continued)

(52) U.S. Cl.
CPC ............. *H04W 24/10* (2013.01); *G01S 19/51* (2013.01); *H04B 17/318* (2015.01);
(Continued)

(58) Field of Classification Search
CPC .... H04B 17/318; H04W 4/029; H04W 16/24; H04W 24/10; H04W 88/06; G01S 19/51
See application file for complete search history.

(56) References Cited

U.S. PATENT DOCUMENTS

| | | | |
|---|---|---|---|
| 6,625,135 | B1 | 9/2003 | Johnson et al. |
| 2018/0160271 | A1 | 6/2018 | Vutukuri et al. |
| 2021/0160720 | A1 | 5/2021 | Chiang et al. |

FOREIGN PATENT DOCUMENTS

| | | |
|---|---|---|
| WO | WO2012021614 | 2/2012 |
| WO | WO2015128880 | 9/2015 |

OTHER PUBLICATIONS

Non-Final Office Action for U.S. Appl. No. 16/693,065 "A Cell Map Built and Used by Mobile Devices" Hsin-Fu,H. 31 pages.
(Continued)

*Primary Examiner* — Brian P Cox

(74) *Attorney, Agent, or Firm* — Lee & Hayes, P.C.

(57) ABSTRACT

A knowledge base of cell information can be built and made available to one or more mobile devices. A mobile device with access to this cell information may proactively perform a radio signal scan at a frequency of an expected cell(s) that is/are indicated in the cell information (e.g., if the expected cell is associated with a serving cell and/or with a geolocation that corresponds to the current Global Positioning System (GPS) location of the mobile device). After performing the radio signal scan, the mobile device may store measurement information (e.g., signal strength) about the expected cell(s) in local memory of the mobile device, and, upon receiving an instruction from the serving cell, the mobile device may access the stored measurement information from its local memory, and may send the measurement information to the requesting serving cell.

20 Claims, 7 Drawing Sheets

(51) Int. Cl.
*H04B 17/318* (2015.01)
*H04W 16/24* (2009.01)
*G01S 19/51* (2010.01)
*H04W 88/06* (2009.01)

(52) U.S. Cl.
CPC ........... *H04W 4/029* (2018.02); *H04W 16/24* (2013.01); *H04W 88/06* (2013.01)

(56) References Cited

OTHER PUBLICATIONS

Office Action for U.S. Appl. No. 16/693,065, dated Feb. 7, 2022, Chiang, "A Cell Map Built and Used by Mobile Devices", 33 pages.
Office Action for U.S. Appl. No. 16/693,065, dated May 13, 2022, Chiang, "A Cell Map Built and Used by Mobile Devices", 34 pages.

CELL MAP BUILT AND USED BY MOBILE DEVICES

RELATED APPLICATIONS

This application is a continuation of and claims priority to U.S. patent application Ser. No. 16/693,065, filed Nov. 22, 2019, titled "CELL MAP BUILT AND USED BY MOBILE DEVICES," the entirety of which is incorporated herein by reference.

BACKGROUND

Mobile devices, such as smart phones, are configured to access a cellular network via cells. Each cell is created by an access point, such as an E-UTRAN Node B (eNodeB or eNB), a Next Generation Node B (gNB), etc. The cell enables radio signal communication for mobile devices within a coverage area surrounding the access point. A cell that is currently providing a mobile device with access to the cellular network is called a "serving cell." In an effort to provision the best possible service to a mobile device, a serving cell may, at times, instruct the mobile device to return a measurement report that indicates the radio signal strength (as measured by the mobile device) of other cells within communication range of the mobile device at its present location. After providing such a measurement report to the serving cell, the mobile device predominantly defers to the logic of the serving cell to instruct the mobile device to perform an action, such as attaching to a target cell. For example, the serving cell may instruct the mobile device to attach to a target cell as part of a handover procedure, or to provide the mobile device with E-UTRAN New Radio-Dual Connectivity (EN-DC).

Despite the sophistication of today's mobile devices, they do not retain any information about available cells at previously-visited locations. This means that, if a serving cell instructs a mobile device to scan for other available cells and return a measurement report to the serving cell, and then after doing so, the mobile device leaves and later returns to the same geographical location, the mobile device does not "remember" the cells it discovered previously. This, in turn, means that the mobile device will perform the same procedure (e.g., scan for available cells) every time the mobile device returns to the same geographical location and receives an instruction from a serving cell to return a measurement report. Each time this type of procedure is performed, the scanning for available cells can take a significant amount of time, and it also consumes processing resources, networking resources, and power resources (e.g., battery power), among other resources. One particular pain point in this context is if the mobile device takes too long to scan for available cells and misses a synchronization window of the serving cell, which leads to degraded performance of the mobile device because the mobile device must wait for the next synchronization window before proceeding with an ongoing procedure, such as a handover procedure or a procedure to provide EN-DC to the mobile device.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
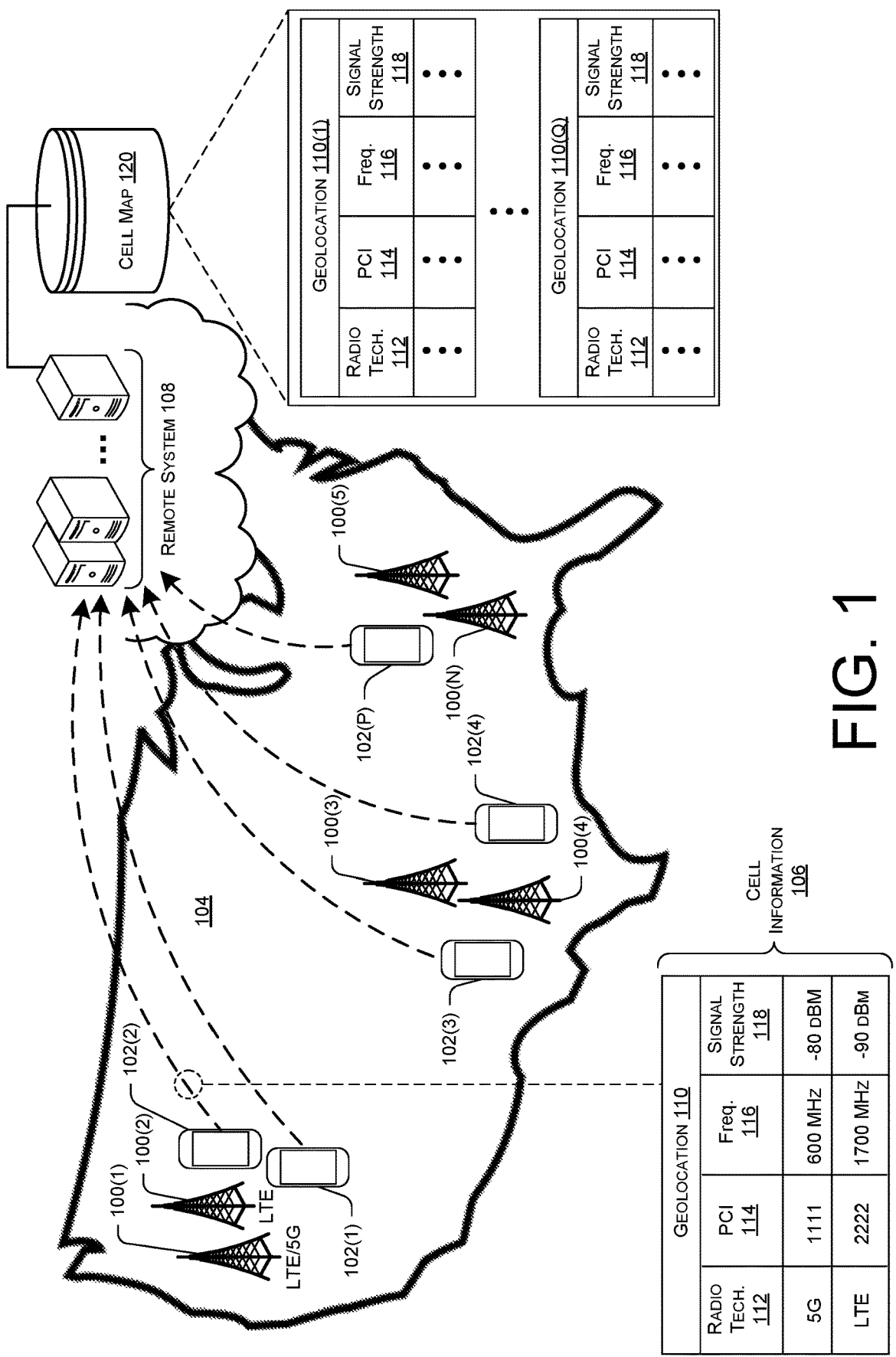
FIG. 1 illustrates an example crowdsourcing technique for building a knowledge base of cell information (sometimes referred to herein as a "cell map") about cells that are observed by mobile devices at various geolocations throughout a geographical area.

Newer mobile devices, such as fifth generation (5G)-compliant mobile devices, are configured to employ the latest radio technologies (e.g., audio and video codecs) to establish communication sessions over a cellular network. The latest radio technologies are often touted as providing greater throughput and/or data transmission rates, improved signal quality, and the like, as compared to their predecessor technologies. Accordingly, when a mobile device is powered on, and when radio capabilities are enabled, the mobile device will attempt to attach to a serving cell, and, given a choice between multiple available cells, the mobile device will generally prefer to attach to the cell that employs the latest radio technology, barring other factors (e.g., capacity, signal strength, etc.) that may dictate otherwise. Regardless of which cell is chosen as the serving cell, in an effort to provision the best possible service to the mobile device, the serving cell is configured to, at times, instruct the mobile device to return a measurement report that indicates the radio signal strengths (as measured by the mobile device) of other cells within communication range of the mobile device. The measurement information sent in this measurement report can be used by the serving cell for various purposes and/or procedures. In an illustrative example, if an eNB cell that provides fourth generation (4G) Long Term Evolution (LTE) service (but not 5G service) is acting as a serving cell of a mobile device, the eNB cell may instruct the mobile device to scan for, and measure a signal strength of a radio signal from, an available gNB cell in an effort to provide EN-DC for the mobile device.

Disclosed herein are techniques, devices, and systems for building a knowledge base of cell information, called a "cell map", making at least a portion of the cell map accessible to one or more mobile devices, and utilizing the cell information in the cell map to improve the performance and/or the operation of the mobile device, such as in a context where the mobile device is interacting with a serving cell. In an illustrative example, as a mobile device is carried by a user between various geographical locations (sometimes referred to herein as "geolocations") and is used to access services over a cellular network, the mobile device may discover cells that the mobile device uses to access the services. After discovering the cells, the mobile device may update cell information about the discovered cells. In some embodiments, the mobile device may update cell information in local memory of the mobile device by storing a cell identifier associated with the discovered cell, a frequency associated with the discovered cell, and, in some cases, a signal strength associated with the discovered cell (as measured by the mobile device). The cell identifier, the frequency, and/or the signal strength may be associated with a geolocation that corresponds to a current Global Positioning System (GPS) location of the mobile device at a time at which the identifier, frequency, and/or signal strength information is obtained by the mobile device. In some embodiments, the mobile device may send updated cell information to a remote system that maintains a larger cell map in a central database. By collecting crowdsourced cell information from a large number of mobile devices, the remote system is able to build a knowledge base of cell information (a "cell map"), and such a cell map may indicate cells that were observed by one or more mobile devices from various geolocations. In this sense, cell identifiers and/or frequencies of observed cells may be associated with particular geolocations in the cell map. The cell map may, additionally, or alternatively, store "bindings" between neighbor cells based on a common geolocation from which a pair of cells have been observed by one or more mobile devices.

Whether a single mobile device builds such a cell map in local memory of the mobile device, and/or whether a remote system builds such a cell map through crowdsourcing, over time, one can appreciate that a substantial collection of cell information about observed cells over a geographical area(s) may be stored and made accessible to a given mobile device (from local memory of the mobile device and/or via access to the central database of the remote system). In the case of crowdsourced cell information collected by the remote system, one can appreciate that such a remote system can potentially amass a large number of data points regarding geolocations, cells observed from those geolocations, and/or bindings between multiple neighboring cells, which can be made accessible to mobile devices for download and/or caching in local memory of the mobile devices, and for utilization by the mobile devices to improve their ability to recall cells that were observed (by themselves and/or by other mobile devices) during a previous visit(s) to a given geographical location.

In an example process, a mobile device may send, to a remote system, a request for cell information about cells in a given geographical area. For example, this request may include a location associated with the mobile device and/or a location associated with a user account of a user of the mobile device, and the remote system may return location-specific cell information that is specific to the location included in the request for cell information. In this way, the mobile device can receive, from the remote system, cell information that is relevant to the current location of the mobile device, and/or relevant to likely future locations of the mobile device. The mobile device can store this cell information in memory of the mobile device for subsequent use of the cell information. In another example, the mobile device may collect its own cell information and store the cell information in local memory of the mobile device. Accordingly, requesting cell information from the remote system is purely optional for purposes of implementing the techniques and systems described herein. Crowdsourcing has advantages of building a more robust cell map by virtue of more mobile devices being used in more diverse geolocations.

The cell information accessible to a mobile device may inform the mobile device about one or more cells the mobile device can expect to encounter at a given geolocation. For example, if the mobile device determines that a current GPS location of the mobile device matches (e.g., is at least within a threshold distance from) a geolocation(s) specified in the cell information accessible to the mobile device, the mobile device may proactively perform a radio signal scan at a frequency of an expected cell(s) that is/are indicated in the cell information as being associated with the matching geolocation(s), and the mobile device can measure a signal strength(s) of a radio signal(s) from the expected cell(s) based on the proactively-performed radio signal scan. Additionally, or alternatively, if the mobile device determines that a cell identifier of its serving cell is specified in the cell information accessible to the mobile device, the mobile device may proactively perform the radio signal scan at a frequency (or frequencies) associated with another cell(s) that is/are "bound" to the serving cell based on a common geolocation from which the multiple cells have been observed in the past.

The mobile device can perform a radio signal scan proactively (i.e., before a serving cell asks for a measurement report) at any suitable time, as described in more detail below. After performing the radio signal scan, the mobile device may store measurement information about the observed cell(s) in local memory of the mobile device. Such measurement information may include at least the measured signal strength(s) of the observed cell(s). Thereafter, the mobile device may wait to receive an instruction from a serving cell to return a measurement report to the serving cell, and, once the instruction is received, the mobile device may access the stored measurement information from its local memory, and may send the measurement information to the requesting serving cell. The response time of the mobile device in this context is greatly reduced, as compared to existing mobile device logic, by virtue of storing the measurement information in local memory of the mobile device so that the measurement information is readily available to the mobile device in advance of receiving an instruction that the mobile device expects to receive from a serving cell.

The disclosed techniques, devices, and systems improve the performance and/or the operation of mobile devices by enabling the mobile devices to recall, or remember, cells that have been observed during a previous visit(s) of a mobile device(s) to a geographical location, thereby allowing the mobile devices to proactively obtain information (e.g., signal strength measurements) that the mobile devices anticipate serving cells will request them to provide. In other words, a mobile device, with a priori knowledge of cells it expects to have available at a particular geolocation, can shift forward-in-time the resource-intensive procedures (e.g., performing one or more radio signal scans) that are likely to be performed in the near future. In this manner, these resource-intensive procedures can be performed by the mobile device at a more convenient time, rather than a time when responding quickly to a serving cell is beneficial. This results in a mobile device that is configured to respond to requests from a serving cell much faster than existing mobile devices can respond to the serving cell with the same information. For example, in contrast to an existing mobile device waiting for a serving cell to request a measurement report, and, in response, performing a radio signal scan to obtain measurement information, the mobile device that implements the techniques described herein will already have this measurement information readily available in local memory, which allows the mobile device to respond to requests from serving cells very quickly and with little-to-no latency. This may, in turn, improve downstream procedures, such as handover procedures and/or procedures to provide the mobile device with EN-DC in a 5G environment.

As a byproduct of the described improvements in the performance and/or the operation of the mobile device, the user experience is enhanced by the techniques and systems described herein because a user of the mobile device will enjoy a mobile device that can quickly respond to requests from serving cells, thereby improving the functionality of the mobile device in the context of interacting with a serving cell for a better user experience. The techniques, devices, and systems described herein may further allow one or more devices to conserve resources with respect to processing resources, memory resources, networking resources, power resources, etc., in the various ways described herein. For example, by streamlining interactions with a serving cell, a mobile device may conserve battery power by not spending as much time waiting for the next synchronization window from a serving cell.

Disclosed herein are processes, as well as systems comprising one or more processors and one or more memories (e.g., non-transitory computer-readable media) storing computer-executable instructions that, when executed by the one or more processors perform various acts and/or processes disclosed herein.

FIG. 1 illustrates an example crowdsourcing technique for building a knowledge base of cell information (sometimes referred to herein as a "cell map") about cells 100 that are observed by mobile devices 102 at various geolocations throughout a geographical area 104. FIG. 1 illustrates a plurality of mobile devices 102(1), 102(2), 102(3), 102(4), . . . , 102(P) (collectively 102) distributed throughout the geographical area 104, which, in the example of FIG. 1, represents the contiguous United States, although it is to be appreciated that the mobile devices 102 and the cells 100 may be distributed throughout any suitable geographical area 104 anywhere in the world, at any scale or level of granularity when implementing the techniques and systems described herein.

An individual mobile devices 102 may be implemented as any suitable mobile computing device configured to communicate over a wireless network, including, without limitation, a mobile phone (e.g., a smart phone), a tablet computer, a laptop computer, a portable digital assistant (PDA), a wearable computer (e.g., electronic/smart glasses, a head-mounted display (HMD), a smart watch, fitness trackers, etc.), and/or any similar mobile device 102. In accordance with various embodiments described herein, the terms "wireless communication device," "wireless device," "communication device," "mobile device," "computing device," "electronic device," "user device," and "user equipment (UE)" may be used interchangeably herein to describe any mobile device 102 capable of performing the techniques described herein. The mobile device 102 may be capable of communicating wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), voice over New Radio (VoNR)— e.g., 5G, IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

FIG. 1 illustrates a plurality of cells 100(1), 100(2), 100(3), 100(4), 100(5), . . . , 100(N) (collectively 100) distributed throughout the geographical area 104. As used herein, a "cell" 100 represents an access point (e.g., a cell tower, base station, etc.) and the coverage area created by the access point. The "coverage area", in this context, means the area or space around the access point in which a mobile device 102 can effectively access a cellular network (e.g., a core network, such as an Internet Protocol Multimedia Subsystem (IMS) core) using radio frequency (RF) transmissions. The access point itself may include electronic communications equipment, antennae, and the like for communicating with mobile devices 102 using RF waves that are detectable within the coverage area of the cell 100. Each cell 100 may be associated with a particular radio access technology (RAT), or a combination of different RATs. In an illustrative example, the cell 100(1) may be associated with both 4G LTE and 5G RATs (as indicated in FIG. 1), and the cell 100(2) may be exclusively associated with a 4G LTE RAT (as indicated in FIG. 1). In this manner, a given mobile device 102 may employ whichever type of RAT is associated with the cell 100 to which the given mobile device 102 is attached. Accordingly, any individual cell 100 may be enabled by one or more types of access points, such as a Base Transceiver Station (BTS) and/or a Node B that provides second generation (2G) and/or third generation (3G) service to attached mobile devices 102, and/or an eNB that provides 4G LTE service to attached mobile devices 102, and/or a gNB that provides 5G service to attached mobile devices 102, and/or any future type of node associated with any future IP-based network technology or evolution of an existing IP-based network technology. When a mobile device 102 is attached to a cell 100 to access a cellular network (e.g., to establish a voice-based communication session, a data-based communication session, etc.), the cell 100 providing the mobile device 102 with the access to the cellular network at the given moment is referred to as the "serving cell" 100.

In general, users of the mobile devices 102 shown in FIG. 1 may have subscribed to services that a carrier (or cellular network operator) provides to its customers. Such a carrier may utilize the cellular network (sometimes referred to herein as a "telecommunications network") for delivering IP multimedia to the mobile devices 102 of its customers. For example, a service provider may offer multimedia telephony services that allow a subscribed user to call or message other users via the cellular network using his/her mobile device 102. A user can also utilize an associated mobile device 102 to receive, provide, or otherwise interact with various different services by accessing a core network via various network nodes. In this manner, a carrier may offer any type of service(s) (e.g., IMS-based services), such as telephony services (or voice calling), emergency services (e.g., E911), gaming services, instant messaging services, presence services, video conferencing services, social networking and sharing services, location-based services, push-to-talk services, WiFi calling services, real time text (RTT) services, RTT calling services and/or video calling services, and so on. In order to access one or more of these services, a mobile device 102 is configured to complete a registration procedure and thereafter request establishment of a communication session via a serving cell 100.

As the mobile devices 102 of FIG. 1 are used to access the services described herein, and/or services generally known to a person having ordinary skill in the art, the mobile devices 102 communicate (i.e., send and receive data) through the cells 100 to which the mobile devices 102 are attached. Furthermore, in an effort to provision the best possible service to a given mobile device 102, a serving cell 100 is configured to, at times, instruct the mobile device 102 to return a measurement report that indicates the radio signal strengths of other cells within communication range of the mobile device 102, as measured by the mobile device 102. The measurement information in the measurement report can be used by the serving cell 100 for various purposes and/or procedures. In an illustrative example, cell 100(2) may be a serving cell 100 for a mobile device 102(2) at the given moment, and the serving cell 100(2) may represent an eNB that provides 4G LTE service (but not 5G service). In this example, the serving cell 100(2) may instruct the mobile device 102(2) to scan for an available gNB in an effort to provide EN-DC for the mobile device 102(2). Consider, as well, a scenario where the mobile device 102(2) has never before visited a geolocation within communication range of the cell 100(2), or a scenario where the cell 100(2) (and possibly the cell 100(1)) is/are a brand-new cell(s) recently brought online, and the mobile device 102(2) does not otherwise have cell information about the cells 100 associated with the geolocation near the cell 100(2). In such a scenario, upon performing a radio signal scan, the mobile device 102(2) may discover cell 100(1) that is near the serving cell 100(2), and may determine that the cell 100(1) is a gNB cell that provides 5G service.

In response to an event that triggers it to do so, the mobile device 102(2) may store information about the discovered cell 100(1) (and possibly information about the serving cell 100(2)) in local memory as "cell information 106", and/or the mobile device 102(2) may send the information as cell information 106 to a remote system 108. It is to be appreciated that various events may trigger the mobile device 102(2) to store and/or send to a remote system 108 new/ updated cell information 106. For example, discovering a never-before encountered cell 100 may be one type of event that triggers the mobile device 102(2) to store and/or send to a remote system 108 cell information 106 about the newly-discovered cell. Additionally, or alternatively, the mobile device 102(2) may store and/or send to a remote system 108 new/updated cell information 106 any time a serving cell 100 instructs the mobile device 102 to return a measurement report. Other events that trigger the acquisition of new/ updated cell information 106 are also contemplated herein.

The cell information 106 sent from the mobile device 102(2) to the remote system 108 may include, for a geolocation 110 that corresponds to the current GPS location of the mobile device 102(2), one or more of: (i) a radio technology 112 associated with the cell(s) 100, (ii) a cell identifier 114 (e.g., a "physical cell ID (PCI)" 114) associated with the cell(s) 100, (iii) a frequency 116 associated with the cell(s) 100, and/or (iv) a signal strength 118 of a radio signal from the cell(s) 100, as measured by the mobile device 102(2). The radio technology 112 may represent a type of RAT associated with the cell 100. Accordingly, in the example of FIG. 1, the radio technology 112 associated with the cell 100(1) is specified in the cell information 106 as "5G" (which is perhaps the best available RAT or service layer associated with the cell 100(1)), and the radio technology 112 associated with the cell 100(2) is specified in the cell information 106 as "LTE" (which is perhaps the best available RAT or service layer associated with the cell 100(2)).

The cell identifier 114 may represent any suitable identifier of the cell 100, such as a PCI of the cell 100. In the illustrative example of FIG. 1, the cell identifier 114 of the cell 100(1) is specified in the cell information 106 as "1111," and the cell identifier 114 of the cell 100(2) is specified in the cell information 106 as "2222." It is to be appreciated that these values for the cell identifier 114 are imaginary values and are provided for illustrative purposes in this disclosure to indicate that the cells 100(1) and 100(2) are distinct cells 100.

The frequency 116 represents a frequency value or frequency band (expressed in any suitable unit of measurement, such as Megahertz (MHz)) that is associated with the cell 100. Accordingly, in the example of FIG. 1, the frequency 116 of the cell 100(1) is specified in the cell information 106 as 600 MHz. A 600 MHz frequency may correspond to the 5G n71 band used in the United States at the time of this writing. Meanwhile, the frequency 116 of the cell 100(2) is specified in the cell information 106 as 1700 MHz. A 1700 MHz frequency may correspond to the LTE Band 66 used in North America at the time of this writing. It is to be appreciated that these values for the frequency 116 are merely exemplary and are provided for illustrative purposes in this disclosure.

The signal strength 118 represents the signal strength of a radio signal from the cell 100, as measured by the mobile device 102 in question (e.g., the mobile device 102(2) in the example of FIG. 1). The signal strength 118 may be expressed in any suitable unit of measurement. In some embodiments, the signal strength 118 represents a reference signal received power (RSRP) parameter, and/or a reference signal received quality (RSRQ) parameter. Accordingly, in the example of FIG. 1, the signal strength 118 of a radio signal from the cell 100(1) is specified in the cell information 106 as −80 decibel-milliwatt (dBm), and the signal strength 118 of a radio signal from the cell 100(2) is specified in the cell information 106 as −90 dBm. It is to be appreciated that these values for the signal strength 118 are merely exemplary and are provided for illustrative purposes in this disclosure.

Over time, the plurality of mobile device 102, each operating in a similar fashion to that described above with respect to the mobile device 102(2), may store their own cell information 106 in local memories of the respective mobile devices 102, and/or the mobile devices 102 may send their own cell information 106 to the remote system 108 as part of a crowdsourcing approach. In the crowdsourcing example, the remote system 108 may aggregate the collected cell information 106 from multiple mobile devices 102 to create a knowledge base of cell information 106, sometimes referred to herein as a "cell map" 120. As its name implies, the cell map 120 conveys information regarding the whereabouts of the cells 100 that were observed by the mobile devices 102, and the cell map 120 can do this by associating the cells 100 with geolocations 110 where the cells 100 were observed by one or more mobile devices 102, and/or by associating (or establishing a "binding" between) multiple neighbor cells 100 that may be observable from a common geolocation.

It is to be appreciated that multiple observations of a cell 100 by different mobile devices 102 from a common geolocation 110 can be used as corroborating evidence that the cell 100 is in fact located near the reported geolocation 110. Meanwhile, different geolocations 110 reported by the same mobile device 102, or by different mobile devices 102, for a single cell 100 may not necessarily be conflicting, seeing as how the cell 100 may be observable from difference geolocations 100. Accordingly, a given cell 100 may be associated with multiple geolocations 110 (i.e., a one-to-many association) within the cell map 120, and multiple cells 100 may be associated with a given geolocation 110 (i.e., a many-to-one association). As shown in FIG. 1, the cell map 120 may include, for each of a plurality of geolocations 110(1)-110(Q), cell information like the cell information 106 that was described as being transmitted by the mobile device 102(2) to the remote system 108. That is, the cell information 106 that makes up the cell map 120 may include, without limitation, for a given cell 100 observed at a given geolocation 110, (i) the radio technology 112 associated with the cell 100, (ii) the cell identifier 114 associated with the cell 100, (iii) the frequency 116 associated with the cell 100, (iv) the signal strength 118 of a radio signal from the cell 100 (as measured by one or more mobile devices 102), and possibly additional parameters, such as timestamps indicating a time when the observation of the signal strength 118 was made by the mobile device 102 that reported the cell information 106. It is to be appreciated that the remote system 108 may perform statistical calculations on the values in the cell map 120, such as by computing average values, and/or other statistical metrics, based on multiple observations with respect to a cell 100. For example, if two different mobile devices 102, such as the mobile device 102(1) and the mobile device 102(2), report cell information 106 for a given cell 100(2), as observed from the same geolocation 110, but with different values for measured signal strength 118, the cell map 120 may calculate an average signal strength 118 value based on two or more values it received from the respective mobile devices 102.

The mobile devices 102 may communicate with the remote system 108 (sometimes referred to herein as "computing system 108," or "remote computing system 108") over any suitable computer network including, without limitation, the Internet, other types of data and/or voice networks, a wired infrastructure (e.g., coaxial cable, fiber optic cable, etc.), a wireless infrastructure (e.g., RF, cellular, satellite, etc.), and/or other connection technologies. The remote system 108 may, in some instances be part of a network-accessible computing platform that is maintained and accessible via a computer network, and the remote system 108 may represent a plurality of data centers distributed over a geographical area, such as the geographical area 104. Network-accessible computing platforms such as this may be referred to using terms such as "on-demand computing", "software as a service (SaaS)", "platform computing", "network-accessible platform", "cloud services", "data centers", and so forth.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 2:
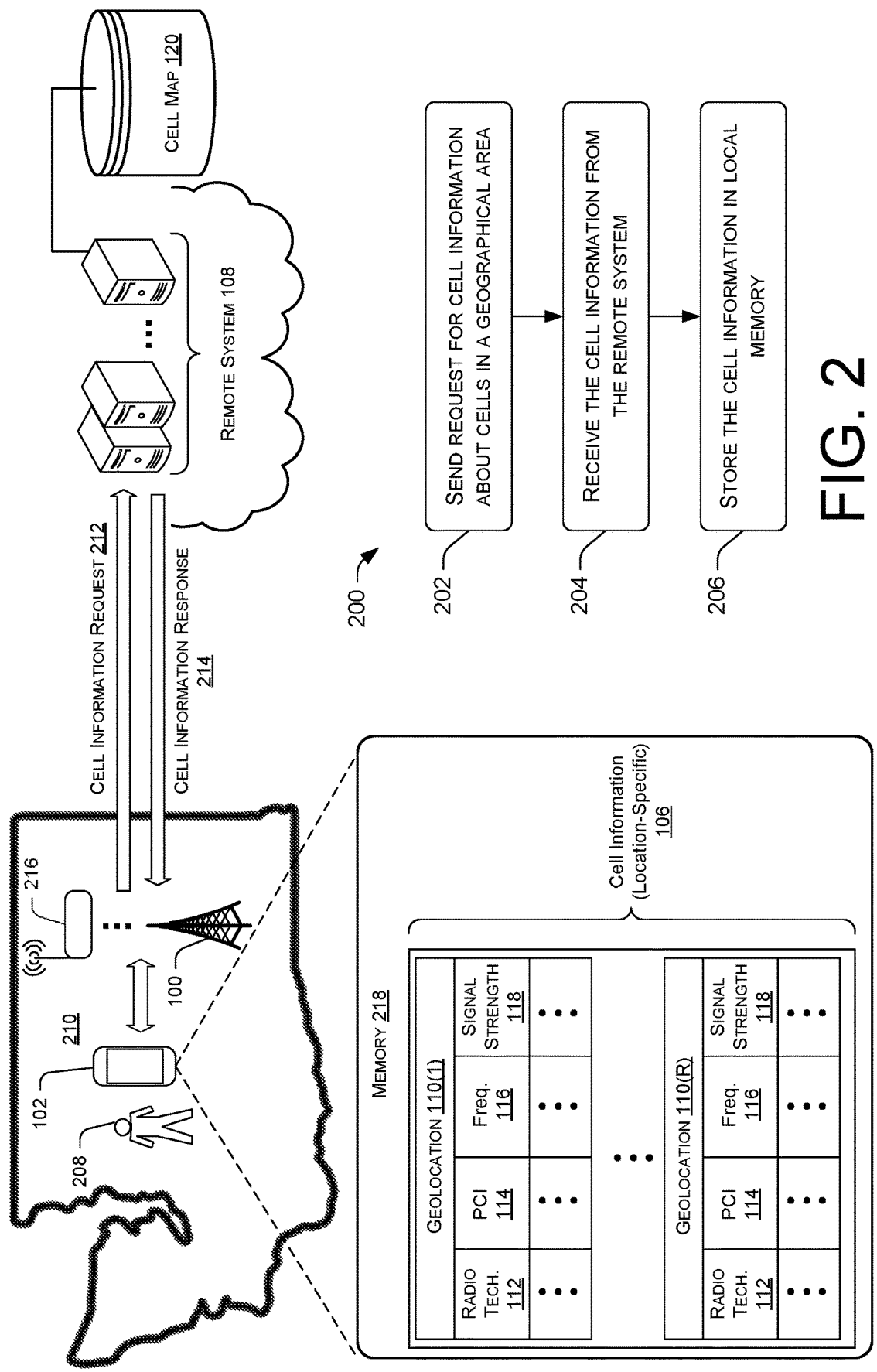
FIG. 2 illustrates a diagram and a flowchart of an example process for accessing (e.g., downloading, caching, etc.) location-specific cell information from a remote system.

FIG. 2 illustrates a diagram and a flowchart of an example process 200 for accessing (e.g., downloading, caching, etc.) location-specific cell information from a remote system 108. FIG. 2 illustrates that a user 208 of a mobile device 102 may have the mobile device 102 in his/her possession while the user 208 is located at a geographical location within a geographical area 210, which, in the example of FIG. 2, represents the State of Washington, in the United States, although it is to be appreciated that the geographical area 210 may represent any suitable geographical area anywhere in the world, at any suitable scale or level of granularity other than the example shown in FIG. 2.

At block 202 of the process 200, the mobile device 102 may send, to a remote system 108, a request 212 for cell information 106 about cells 100 in a geographical area 210. The request 212 may include a location of the mobile device 102 (e.g., a GPS location of the mobile device 102, an IP address, etc.) and/or a location associated with a user account of the user 208 of the mobile device 102 (e.g., a mailing address specified in the user account, a location input by the user 208 (e.g., using a touchscreen or another input device) to the mobile device 102, etc.).

At block 204 of the process 200, the mobile device 102 may receive the requested cell information 106 in a response 214 from the remote system 108. By providing a location in the request 212 for cell information 106, the remote system 108 may send the response 214 to the mobile device 102 that includes some, but not all, of the cell information 106 in the cell map 120 accessible to the remote system 108. That is, the response 214 may include location-specific cell information 106 that is specific to the location specified in the request 212 and/or cell information 106 that is specific to the geographical area 210 that includes the location specified in the request 212. For example, if the request 212 includes latitude and longitude coordinates in Seattle, Wash., the remote system 108 may provide cell information 106 for geolocations 110 located in the State of Washington, or possibly a smaller or larger geographical area that includes Seattle. The request 212 and the response 214 may be transmitted over any suitable computer network described herein, and via any suitable access point, such as via a cell 100 (e.g., a cell site) or another wireless access point 216. The wireless access point 216 may represent a wireless router in the user's 208 home or office, for example. The location-specific cell information 106 may include, for individual geolocations 110 of a set of geolocations 110(1)-110 (R), one or more of a (i) radio technology 112 (or radio technologies 112) associated with a cell(s) 100, (ii) a cell identifier(s) 114 associated with a cell(s) 100, (iii) a frequency 116 (or frequencies 116) associated with the cell(s) 100, and/or (iv) a previously-observed signal strength(s) 118, or an average signal strength 118, of a radio signal(s) from the cell(s) 100.

At block 206 of the process 200, the mobile device 102 may store the cell information 106 in memory 218 of the mobile device 102 (sometimes referred to herein as "local memory" 218 to denote that the memory 218 is embedded in, and/or removably attached to, the mobile device 102 such that the mobile device 102 does not have to access the memory 218 over a wide area network connection). The location-specific cell information 106 may be downloaded to, or otherwise cached in, the memory 218 of the mobile device 102 in an on-demand fashion so that the mobile device 102 need not maintain the entire cell map 120 for a large geographical region, such as the geographical area 104 of FIG. 1, and may thereby conserve memory resources of the mobile device 102. In other words, the mobile device 102 can download exclusively the cell information 106 that it is likely to utilize, such as cell information 106 specific to the geographical area 210 within which the user 208 typically carries the mobile device 102.

Figure 3:
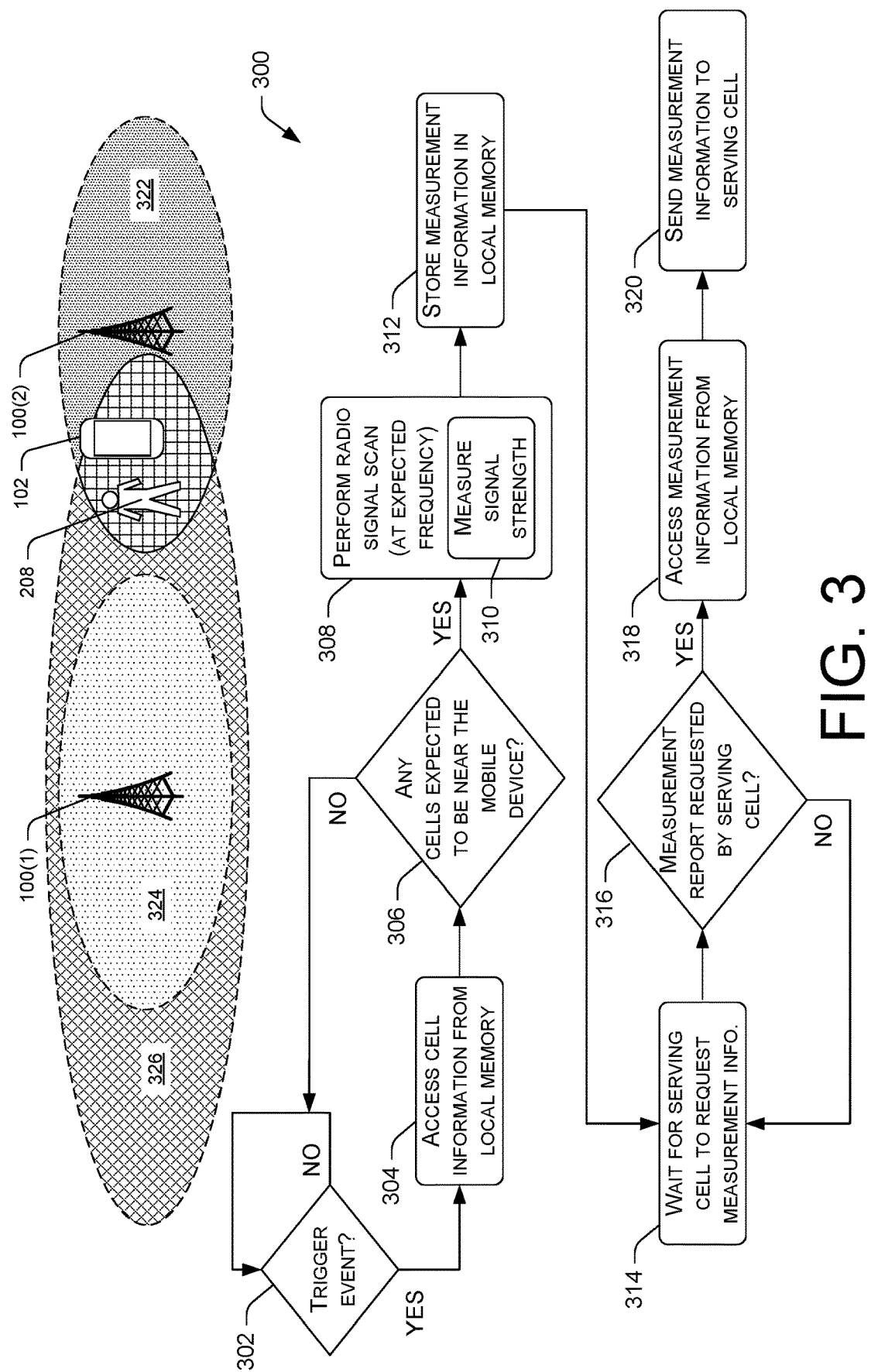
FIG. 3 illustrates a diagram and a flowchart of an example process implemented by a mobile device for proactively measuring a signal strength(s) of an expected cell(s) at a present location of the mobile device, storing the measurement information in local memory, and retrieving the measurement information from local memory when a serving cell instructs the mobile device to return a measurement report.

FIG. 3 illustrates a diagram and a flowchart of an example process 300 implemented by a mobile device 102 for proactively measuring a signal strength(s) of an expected cell(s) 100 at a present location of the mobile device 102, storing the measurement information in local memory, and retrieving the measurement information from local memory when a serving cell 100 instructs the mobile device to return a measurement report.

At block 302 of the process 300, logic of the mobile device 102 may determine whether a trigger event has occurred. The occurrence of a trigger event may cause the mobile device 102 to access the cell information 106 stored in the memory 218 of the mobile device 102 at block 304. Examples of trigger events include, without limitation, passage of a predetermined amount of time (e.g., the mobile device 102 may check the cell information 106 every few seconds, every minute, every few minutes, etc.), determining that the mobile device 102 has attached to a serving cell 100 (e.g., when the mobile device 102 attaches to the cell 100(2) as the serving cell 100, the mobile device 102 may check the cell information 106), determining that the mobile device 102 has moved a distance that is greater than or equal to a threshold distance since previously accessing the cell information 106 (e.g., with every 100 meters, 200 meters, etc. of movement, the mobile device 102 may check the cell information 106), determining that the mobile device 102 has transitioned from a powered-off state to a powered-on state (e.g., when the mobile device 102 is powered on, the mobile device 102 may check the cell information 106), and/or determining that the mobile device 102 has transitioned from an airplane mode to a cellular communication mode (e.g., when a user 208 takes the mobile device 102 out of airplane mode, the mobile device 102 may check the cell information 106). If the logic of the mobile device 102 determines that a trigger event has not occurred, the process 300 may follow the "NO" route from block 302, where the logic continues monitoring for an occurrence of the trigger event and refrains from accessing the cell information 106 so long as the trigger event does not occur. If, however, the logic of the mobile device 102 determines that a trigger even has occurred, the process 300 may follow the "YES" route from block 302 to block 304.

At block 304 of the process 300, in response to the occurrence of the trigger event, logic of the mobile device 102 may access the cell information 106 stored in the memory 218 of the mobile device 102. This cell information 106 may have been previously received from a remote system 108, as described herein (e.g., with respect to FIG. 2), and the cell information 106 may have been stored (e.g., downloaded, cached, etc.) in the memory 218 of the mobile device 102. Alternatively, the mobile device 102 may have stored the cell information 106 in local memory 218 itself (i.e., without receiving the cell information 106 from the remote system 108) as a result of a prior visit(s) to its current geolocation. In some embodiments, the mobile device 102 may store a cell map 120 on disk storage that includes cell information 106 for a relatively large geographical area(s), and the mobile device 102 may load, into working memory 218, location-specific cell information 106 based on its current GPS location, for example. In this manner, the mobile device 102 may load only what it might utilize at its present location, and may keep, on disk storage where there is ample storage, a remainder of cell information 106 that the mobile device 102 is unlikely to use at its present location.

At block 306 of the process 300, logic of the mobile device 102 may determine, using the accessed cell information 106, whether there are any known cells 100 that are expected to be near the mobile device 102. The determination at block 306 can be accomplished in various ways. One way is by comparing the current GPS location of the mobile device 102 to geolocations 110 that are specified in the cell information 106 to see if there is a "hit(s)" or a "match(es)", and then determining if there is a cell(s) 100 associated with the matching geolocation 110 other than a serving cell 100 of the mobile device 102, if the mobile device 102 is attached to a serving cell 100. For example, the logic of the mobile device 102 may determine that its current GPS location "matches" a geolocation 110 specified in the cell information 106, and may determine that a cell identifier 114 and/or a frequency 116 of the cell 100(1) is associated with the geolocation 110. In this example, the GPS location of the mobile device 102 may "match" a geolocation 110 if the current GPS location is less than or equal to a threshold distance from the geolocation 110 (e.g., within 20 meters, 30 meters, 40 meters, 100 meters, etc., of the geolocation 110). In other words, the latitude and longitude of the GPS location may not have to exactly match the latitude and longitude of the geolocation 110 specified in the cell information 106 in order to establish a "hit" or a "match", which accounts for the inherent inaccuracy of the GPS locations acquired using a GPS receiver of the mobile device 102. Furthermore, it is to be appreciated that there may be multiple "hits" or "matching geolocations" if the logic of the mobile device 102 is configured to identify geolocations 110 within a predefined radius of the current GPS location of the mobile device 102.

Another way to make the determination at block 306 is by comparing a cell identifier of a serving cell 100 to cell identifiers 114 specified in the cell information 106. For example, if the cell 100(2) is the serving cell for the mobile device 102, logic of the mobile device may, at block 306, determine if the serving cell 100(2) has a cell identifier that is specified in the cell information 106, and then the logic of the mobile device 102 may determine if the cell information 106 indicates a binding between the serving cell 100(2) and another cell(s) 100. In the example of FIG. 3, the cell information 106 may indicate a binding between the serving cell 100(2) and the cell 100(1) based on the pair of cells 100(1)/(2) having both been observed at a common geolocation 110 in the past. In a scenario where the logic of the mobile device 102 traverses the cell information 106 for a matching cell identifier 114, the logic of the mobile device 102 may look for an exact match of the cell identifier (e.g., a matching PCI that has the same value as the PCI of the serving cell 100(2)).

If, at block 306, the logic of the mobile device 102 determines that there aren't any cells that are expected to be near the mobile device 102, the process 300 may follow the "NO" route from block 306 back to block 302, where the logic awaits the occurrence of another trigger event before accessing the cell information 106 again. If, however, the logic of the mobile device 102 determines, at block 306, that there is at least one cell, such as the cell 100(1), which is expected to be near the mobile device 102, the process 300 may follow the "YES" route from block 306 to block 308.

At block 308 of the process 300, the mobile device 102 may perform a radio signal scan to measure a signal strength of a radio signal from the cell 100(1) it expects to find at its present location. For example, the logic of the mobile device 102 may determine, from the cell information 106, a frequency 116 associated with the cell 100(1), and the mobile device 102 may, at block 308, perform the radio signal scan at the determined frequency 116. In this scenario, the cell information 106 may indicate that the cell 100(1) has been observed from the geolocation 110 that matches the current GPS location of the mobile device 102, or the cell information 106 may otherwise indicate a binding (or an association) between the cell 100(1) and the serving cell 100(2) based on a common geolocation 110 from which both of the cells 100(1)/(2) have been observed, and the mobile device 102 may determine, from the cell information 106, the frequency 116 associated with the cell 100(1) it expects to find at its present location. Note that the performance of the radio signal scan at block 308 is "proactive" in the sense that the mobile device 102 performs the radio signal scan before the serving cell 100(2) asks it to perform the scan. As a result of performing the radio signal scan at block 308, and assuming the expected cell 100(1) is indeed within communication range of the mobile device 102, the mobile device 102 may, at sub-block 310, measure a signal strength of a radio signal from the cell 100(1). In some embodiments, this signal strength comprises a RSRP parameter, and/or a RSRQ parameter.

It is to be appreciated that the mobile device 102 may refrain from performing a radio signal scan to measure a signal strength of a radio signal from its serving cell 100(2), which may be a waste of resources, despite the serving cell 100(2) being specified in the cell information 106 as a nearby cell. That is, the logic of the mobile device 102 may identify a cell identifier of the serving cell 100(2) within the cell information 106, and may exclude that particular cell 100(2) from consideration in the context of performing the radio signal scan(s) at block 308.

At block 312 of the process 300, the mobile device 102 may store, in the memory 218 of the mobile device 102, measurement information that includes at least the signal strength of the radio signal from the cell 100(1), and possibly signal strengths of one or more other cells 100 specified in the cell information 106. In some embodiments, the measurement information (e.g., signal strength 118) is stored in association with the radio technology 112 associated with the cell 100(1), the cell identifier 114 associated with the cell 100(1), and/or the frequency 116 associated with the cell 100(1). As such, the measurement information stored by the mobile device 102 at block 312 may include these additional parameter values.

In some embodiments, a radio signal scan may be performed at block 308 for purposes of determining a cell 100 that the mobile device 102 prefers to attach to as a serving cell 100 at its present location. This can augment established procedures for attaching to a nearby cell as a serving cell 100. In other words, with a priori knowledge of nearby cells 100, the mobile device 102 may determine, at block 306, that the cell information 106 specifies multiple cells 100 that are expected to be available at the present location of the mobile device 102, and these multiple cells 100 may offer different types of services (e.g., 5G, 4G LTE, etc.). The mobile device 102 may select one of these cells 100 (e.g., a gNB cell) it expects to find at its present location, and the mobile device 102 may perform a radio signal scan at block 308, and if the radio signal is sufficiently strong (e.g., if the signal strength of the radio signal meets or exceeds a threshold signal strength), the mobile device 102 may attach to the cell 100 as a serving cell 100.

At block 314 of the process 300, after storing the measurement information at block 312, the logic of the mobile device 102 may wait to receive an instruction from its serving cell 100(2), which will instruct the mobile device 102 to return a measurement report to the serving cell 100(2). At block 316 of the process 300, the logic of the mobile device 102 may determine whether such an instruction has been received from the serving cell 100(2). If no such instruction has been received, the process 300 may follow the "NO" route from block 316 back to block 314, where the mobile device 102 may continue to wait for the instruction from the serving cell 100(2). It is to be appreciated that the logic of the mobile device 102 may include a timeout mechanism or the like, wherein the mobile device 102 is configured to delete the measurement information from the memory 218 if the mobile device 102 does not receive the instruction from the serving cell 100(2) within a predetermined period of time since storing the measurement information at block 312, and/or if the mobile device 102 does not receive the instruction from the serving cell 100(2) before the occurrence of a predetermined event (e.g., if the mobile device 102 moves beyond a threshold distance from the GPS location where it stored the measurement information at block 312). If, at block 316, the mobile device 102 receives the instruction from the serving cell 100(2) to return a measurement report to the serving cell 100(2), the process 300 may follow the "YES" route from block 316 to block 318.

At block 318 of the process 300, the logic of the mobile device 102 may access the measurement information from the memory 218 of the mobile device 102. At block 320 of the process 300, the mobile device 102 may send the measurement information to the serving cell 100(2).

With reference to the diagram at the top of FIG. 3, the process 300 may be executed by the mobile device 102 when the user 208 brings the mobile device 102 within the coverage area 322 of the cell 100(2). In this scenario, the mobile device 102 may attach to the cell 100(2) as a serving cell 100(2). Consider an example where the cell 100(2) represents a eNB cell that provides 4G LTE service (but not 5G service). In this example, the serving cell 100(2) may instruct the mobile device 102 to return a measurement report in hopes that the mobile device 102 finds a gNB cell that provides 5G service so that the mobile device 102 can utilize EN-DC. Accordingly, the mobile device 102 may receive, at block 316 of the process 300, the instruction from the serving cell 100(2) to return a measurement report. Because the mobile device 102 has already performed, at block 308, a radio signal scan at a frequency of, say, 600 MHz (e.g., the 5G n71 band), the measurement information (e.g., a signal strength) of the cell 100(1) is readily available in local memory 218 of the mobile device 102, which the mobile device 102 quickly retrieves and sends to the serving cell 100(2) at block 320 of the process 300. In this example, the cell 100(1) may be a gNB cell that provides not only 4G LTE service within a first coverage area 324, but also provides 5G service within a second coverage area 326. In this manner, when the mobile device 102 moves into the 4G LTE coverage area 322 of the cell 100(2) and attaches to the cell 100(2) as the serving cell, the mobile device 102 may remain within the 5G coverage area 326 of the neighbor cell 100(1). Because the mobile device 102 can access cell information 106 indicating that the mobile device 102 should expect the RF signature of the cell 100(1) to be available to the mobile device 102 at its present location, the mobile device 102 is able to proactively scan, at block 308, for the availability of the 5G coverage from the gNB cell 100(1), and, armed with the measurement information of the gNB cell 100(1), the mobile device 102 is able to respond very quickly to the serving cell 100(2) when the serving cell 100(2) requests a measurement report from the mobile device 102 at block 316. Thereafter, the mobile device 102 may be provisioned EN-DC, for example.

In another example, the serving cell 100(2) in FIG. 3 could represent a first gNB cell, and the cell 100(1) could represent a second gNB cell, both cells 100(1)/(2) providing 5G service, and the mobile device 102 may be instructed to implement a handover procedure to switch to the second gNB cell 100(1), or vice versa, if the cell 100(1) is the serving cell. For example, in response to sending the measurement information to the serving cell 100(2) at block 320 of the process 300, the mobile device 102 may attach to the cell 100(1) as a new serving cell, and the mobile device 102 may start, or resume, a communication session via the new serving cell 100(1).

In yet another example, the serving cell 100(2) in FIG. 3 could represent a preferred cell that provides 5G service, and the cell 100(1) could represent a legacy cell, such as a eNB cell that provides 4G LTE service, or a cell that provides 2G/3G service, and the mobile device 102 may be instructed to implement a fallback procedure to switch between layers (e.g., to fallback to LTE, or to 2G/3G) as part of a fallback procedure if, say, the preferred cell 100(2) cannot provision requisite services (e.g., voice services) to the mobile device 102. For example, in response to sending the measurement information to the serving cell 100(2) at block 320 of the process 300, the mobile device 102 may attach to the cell 100(1) as a fallback cell, and the mobile device 102 may start, or resume, a communication session via the fallback cell 100(1). It is to be appreciated that a fallback procedure may be implemented with respect to a single cell 100 as well, such as in a scenario where the serving cell 100(2) provides both a preferred service (e.g., 5G) and a legacy service(s) (e.g., 4G, 3G, 2G, etc.). In this scenario, the mobile device 102 may fallback to a legacy service provided by the same cell 100 to which the mobile device 102 is attached.

It is to be appreciated that, when a serving cell 100 instructs a mobile device 102 to return a measurement report, the serving cell 100, in some embodiments, may specify a list of frequencies to include in the measurement report. For example, the serving cell 100(2) in the diagram of FIG. 3 may transmit a system information block (SIB) to the mobile device 102 that includes a list of neighboring cells (and/or the frequencies of those neighboring cells) that are known to be within a threshold distance from the serving cell 100(2) (sometimes referred to as a "neighbor list"). In this case, the mobile device 102 may be configured to return measurement information that is exclusive to the frequencies specified by the serving cell 100(2). In other words, when the mobile device 102 receives a neighbor list from the serving cell 100(2), the mobile device 102 may refrain from measuring and/or returning measurement information about frequencies that are not included in the neighbor list, even if those frequencies are available to the mobile device 102 at its present location. This may be done because the serving cell 100(2) may not know how to handle measurement information pertaining to frequencies outside of the frequencies specified in the neighbor list, which may help avoid malfunction of the serving cell 100(2).

It is to be appreciated that, under a framework of a self-organizing network, a serving cell 100 may implement an Automatic Neighbor Relation (ANR) function. ANR relieves the cellular network operator from the burden of managing neighbor relations of cells, and it may be useful in situations where cells 100 are continually moving around to different geolocations, and/or when cells 100 are being added or removed frequently. In the example of FIG. 3, if the serving cell 100(2) uses an ANR function, instead of telling the mobile device 102 that it should scan for a certain list of neighbor cells 100 at known frequencies, the serving cell 100(2) may instruct the mobile device 102 to scan for any available cells that the mobile device 102 can find.

Figure 4:
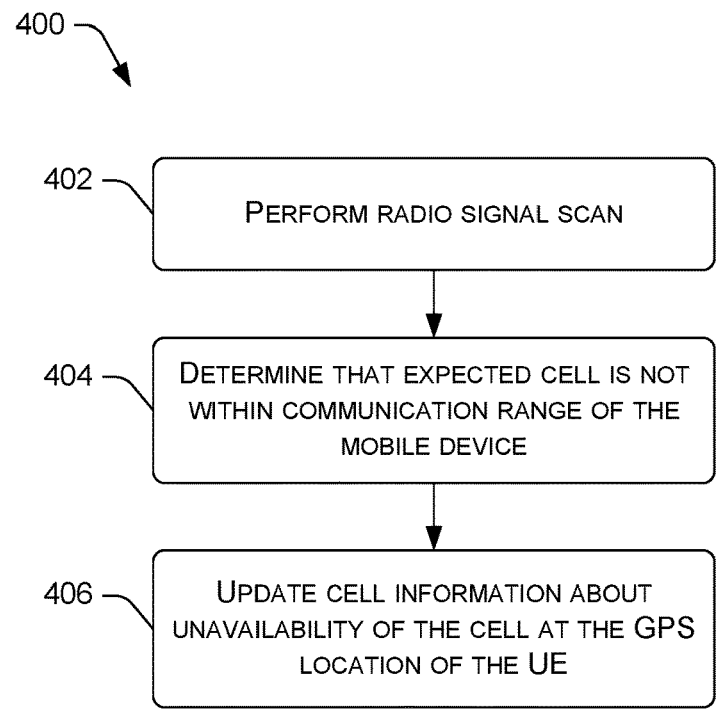
FIG. 4 illustrates a flowchart of an example process for updating cell information after performing a radio signal scan, in accordance with various embodiments.

FIG. 4 illustrates a flowchart of an example process 400 for updating cell information after performing a radio signal scan, in accordance with various embodiments.

At 402, the mobile device 102 may perform a radio signal scan. Considering the process 400 in the context of the process 300, the radio signal scan performed at block 402 may represent the same radio signal scan performed at block 308 of the process 300, or it may represent a second, different radio signal scan, performed separately with respect to the radio signal scan performed at block 308 of the process 300. In an illustrative example, when the mobile device 102 is at a given geolocation 110, the cell information 106 accessed from memory 218 of the mobile device 102 may specify at least two cells (e.g., cell 100(1) and cell 100(3)) that are associated with the geolocation 110. Additionally, or alternatively, the cell information 106 may indicate at least two bindings: one binding between the serving cell 100(2) and cell 100(1), and another binding between the serving cell 100(2) and cell 100(3). In either case, the radio signal scan performed at block 402 may be performed at two different frequencies, one for cell 100(1) and another for cell 100(3). Alternatively, a first radio signal scan may be performed at block 308 of the process 300 at a first frequency of the first cell 100(1), and the radio signal scan performed at block 402 of the process 400 may be a separate (second) radio signal scan performed at a second frequency of a second cell 100(3). In any case, the mobile device 102 may measure a (second) signal strength of a (second) radio signal from a (second) cell 100 at block 402, as a result of performing the radio signal scan.

At 404, logic of the mobile device 102 may determine that the (second) cell 100—which the mobile device 102 expects to find at its present location—is not within communication range of the mobile device 102, based at least in part on the radio signal scan performed at block 402. In some embodiments, determining whether a cell 100 is within communication range of the mobile device 102 involves determining whether the signal strength of the radio signal from the cell 100 meets or exceeds a threshold signal strength. Thus, if a radio signal from a cell is detectable, the cell may still be considered to be "out-of-range" if the signal strength is less than a threshold signal strength. Otherwise, if the mobile device 102 cannot detect a radio signal from the cell 100 whatsoever, the cell 100 may be considered to be out-of-range at block 404. For example, the cell 100 may have been moved to another location, removed completely (e.g., taken offline), or the like.

At 406, the mobile device 102 may update cell information 106 to indicate an unavailability of the (second) cell 100 at the geolocation 110 (e.g., at a geolocation 110 that corresponds to a current GPS location of the mobile device 102). For example, the cell information 106 may be updated at block 406 by storing updated cell information 106 in local memory 218 of the mobile device 102. Additionally, or alternatively, the cell information 106 may be updated by sending, to a remote system 108, updated cell information 106 to indicate an unavailability of the (second) cell 100 at the geolocation 110, and the remote system 108 may update its records in the cell map 120.

Figure 5:
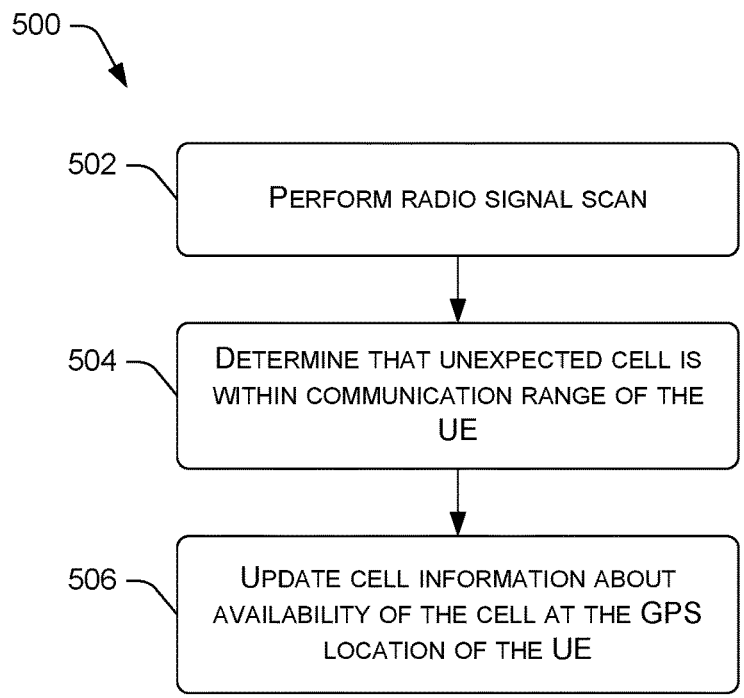
FIG. 5 illustrates a flowchart of an example process for updating cell information after performing a radio signal scan, in accordance with various embodiments.

FIG. 5 illustrates a flowchart of an example process 500 for updating cell information after performing a radio signal scan, in accordance with various embodiments.

At 502, the mobile device 102 may perform a radio signal scan. Considering the process 400 in the context of the process 300, the radio signal scan performed at block 402 may be the same radio signal scan performed at block 308 of the process 300. In an illustrative example, when the mobile device 102 is at a given geolocation 110, the cell information 106 accessed from memory 218 of the mobile device 102 may specify a cell 100(1) that is associated the geolocation 110. Additionally, or alternatively, the cell information 106 may indicate a binding between the serving cell 100(2) and cell 100(1). In any case, the mobile device 102 may expect to find the cell 100(1) upon performing the radio signal scan, and may not expect to find any other cells 100.

At 504, logic of the mobile device 102 may determine that a (second) cell 100—which the mobile device 102 did not expect to find at its present location—is within communication range of the mobile device 102, based at least in part on the radio signal scan performed at block 502. At 504, the logic of the mobile device 102 may determine that this in-range (second) cell 100 is "unexpected" based on a determination that the cell information 106 stored in the memory 218 of the mobile device 102 does not associate a cell identifier of the (second) cell 100 with the geolocation 110 that corresponds to the current GPS location of the mobile device 102 (e.g., the location where the radio signal scan is performed at block 502). For example, the (second) cell 100 may have been recently moved near the present location of the mobile device 102, or brought online at the geolocation 110 recently.

At 506, the mobile device 102 may update cell information 106 to indicate an availability of the (second) cell 100 at the geolocation 110. For example, the cell information 106 may be updated at block 506 by storing updated cell information 106 in local memory 218 of the mobile device 102. Additionally, or alternatively, the cell information 106 may be updated by sending, to a remote system 108, updated cell information 106 to indicate an availability of the (second) cell 100 at the geolocation 110, and the remote system 108 may update its records in the cell map 120. In some embodiments, the updating of the cell information 106 at block 506 may involve storing a timestamp associated with the determining, at block 504, that the (second) cell 100 is within communication range of the mobile device 102. This timestamp information may allow for deleting "stale" information after a period of time since recording the cell information 106, or for otherwise determining when the cell information 106 was recorded, which may allow for resolving conflicts with conflicting cell information (e.g., overwrite old cell information 106 with new cell information 106).

Figure 6:
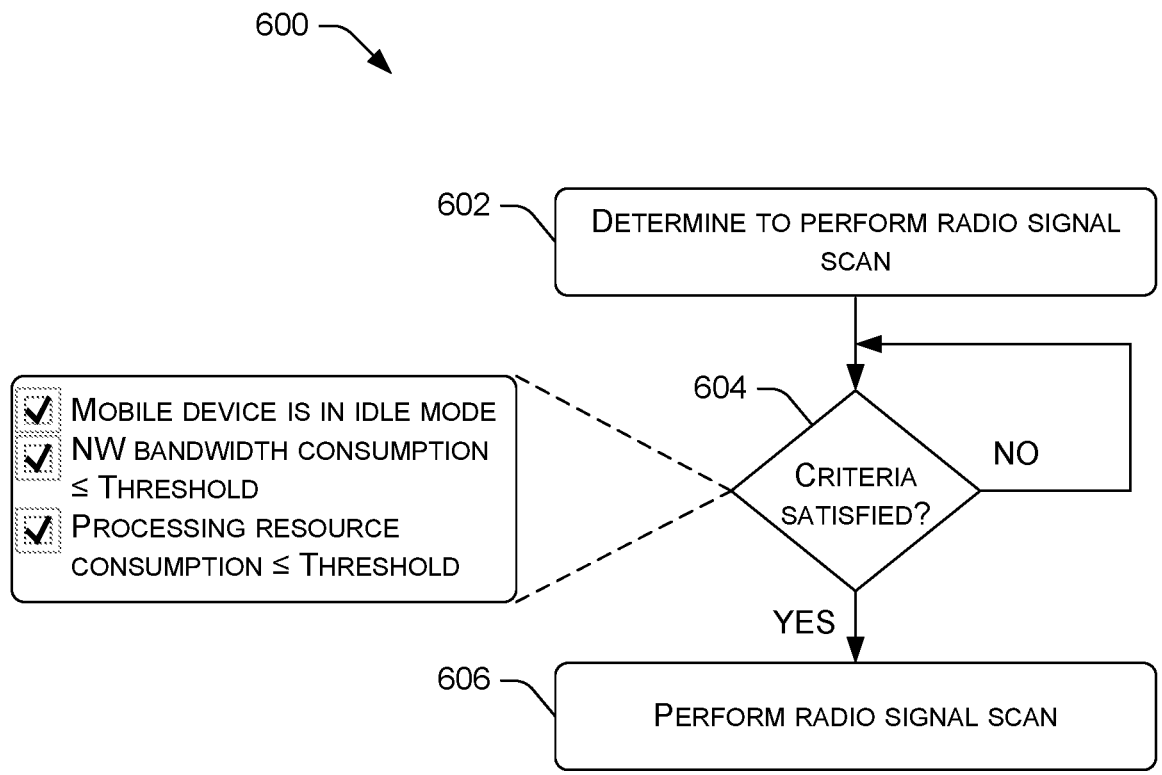
FIG. 6 illustrates a flowchart of an example process for determining whether and when to perform a radio signal scan to measure a signal strength(s) of an expected cell(s) at a present location of the mobile device.

FIG. 6 illustrates a flowchart of an example process 600 for determining whether and when to perform a radio signal scan to measure a signal strength(s) of an expected cell(s) 100 at a present location of the mobile device 102.

At 602, logic of the mobile device 102 may determine to perform a radio signal scan to measure a signal strength(s) of a radio signal(s) from a cell(s) 100 that the mobile device 102 expects to find at its present location, based on cell information 106 available to the mobile device 102. For example, the determination at block 602 may be based on a determination at block 306 of the process 300 in the affirmative (i.e., that there is at least one cell 100 expected to be near the mobile device 102 at its present location).

At 604, logic of the mobile device 102 may determine whether one or more criteria are satisfied. That is, the mobile device 102 may not perform the radio signal scan unless and until one or more criteria are satisfied, and hence, the criteria may be evaluated at block 604. Examples of the criteria evaluated at block 604 include, without limitation, determining whether the mobile device 102 is in idle mode, determining whether network bandwidth consumption of the mobile device 102 is less than or equal to a threshold network bandwidth consumption value, and/or determining whether processing resource consumption of the mobile device 102 is less than or equal to a threshold processing resource consumption value. These exemplary criteria are indicative of convenient times to perform a radio signal scan because it can be deduced that the mobile device 102 is not too busy with other important tasks whenever one or more of these criteria are satisfied. For example, "idle mode" may be a mode where the mobile device 102 is not actively conducting a communication session (e.g., a voice call) over the cellular network. A mobile device 102, such as a smart phone, is often in idle mode when a user 208 carries the mobile device 102 in his/her pocket or purse without using the mobile device 102 (e.g., the screen is locked and the mobile device 102 is not being used). This is one example of a convenient time for the mobile device 102 to perform a radio signal scan. Likewise, if network bandwidth consumption (e.g., based on a measured throughput value) and/or processing resource consumption (e.g., based on a measured percentage of processing resources being utilized, processor cycle count, etc.) is/are low, this means that the mobile device 102 is likely not busy conducting other important tasks, which is another indicator of a convenient time for the mobile device 102 to perform a radio signal scan. If, at block 604, the logic of the mobile device 102 determines that the one or more criteria are not satisfied, the process 600 may follow the "NO" route from block 604 to iterate the determination at block 604 until a criterion (or multiple criteria) is/are satisfied (e.g., the mobile device 102 may wait for a pending task(s) to complete so that processing resources and/or networking resources are freed up to perform the radio signal scan). Once a criterion (or multiple criteria) is/are satisfied at block 604, the process 600 may follow the "YES" route from block 604 to block 606, where the mobile device 102 may perform the radio signal scan. The operations performed at block 606 may be similar to the operation(s) described as being performed at block 308 (and sub-block 310) of the process 300.

Figure 7:
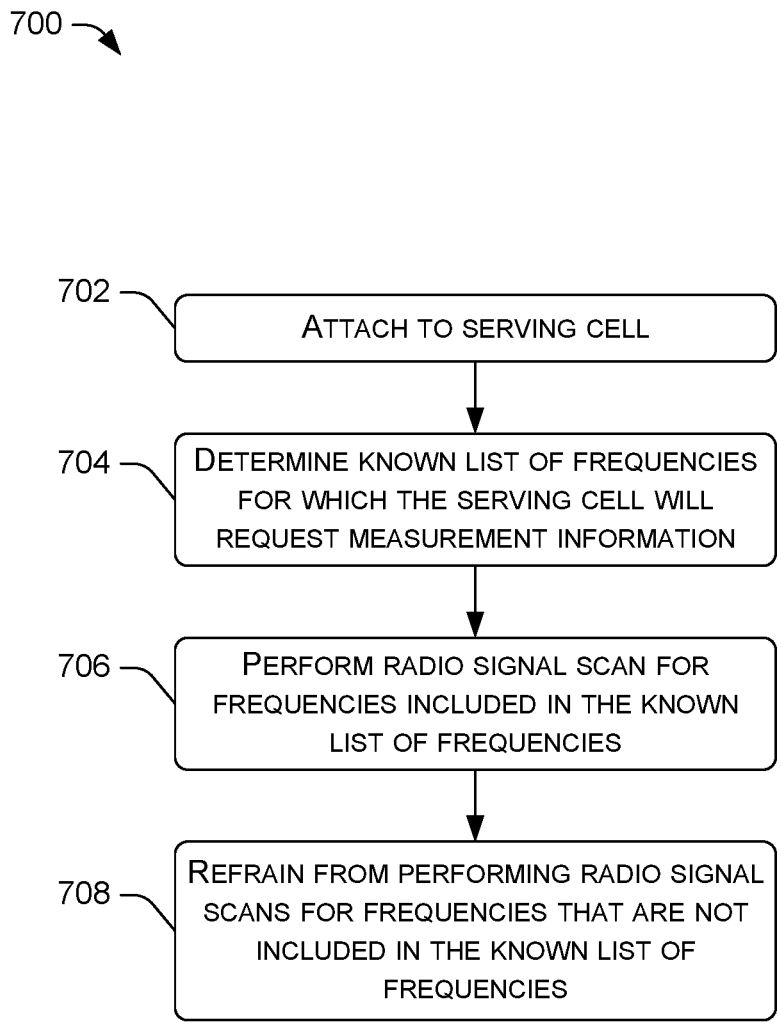
FIG. 7 illustrates a flowchart of an example process for refraining from performing radio signal scans for frequencies that a serving cell will not request.

FIG. 7 illustrates a flowchart of an example process 700 for refraining from performing radio signal scans for frequencies that a serving cell 100 will not request. As noted above, when a serving cell 100 instructs a mobile device 102 to return a measurement report, the serving cell 100, in some embodiments, may specify a list of frequencies to include in the measurement report. For example, the serving cell 100(2) in the diagram of FIG. 3 may transmit a SIB to the mobile device 102 that includes a list of neighboring cells (and/or the frequencies of the neighboring cells) that are known to be within a threshold distance from the serving cell 100(2) (sometimes referred to as a "neighbor list"). Accordingly, the process 700 may be performed in an implementation where a serving cell 100 is configured to send such information to a mobile device 102.

At 702, a mobile device 102 may attach to a serving cell 100. For example, the mobile device 102 may complete a registration procedure and may establish a radio link with the serving cell 100 to access services provided by a carrier via the serving cell 100.

At 704, logic of the mobile device 102 may determine a known list of frequencies that the serving cell 100 will include in a request/instruction to return a measurement report to the serving cell 100. For example, the mobile device 102 may have previously attached to the serving cell 100 at one or more times in the past, and the mobile device 102 may know, from this/these past interaction(s) with the serving cell 100 that the serving cell 100 will request the mobile device 102 to scan for certain frequencies. Additionally, or alternatively, the mobile device 102 may determine, based on the type and/or the location of serving cell 100, that the serving cell 100 will request the mobile device 102 to scan for certain frequencies.

At 706, the mobile device 102 may perform a radio signal scan exclusively for the frequencies included in the known list of frequencies. The performance of the radio signal scan at block 706 may correspond to the radio signal scan(s) performed at block 308 of the process 300, and the operations performed at block 706 may be similar to the operation(s) described as being performed at block 308 (and sub-block 310) of the process 300.

At 708, the mobile device 102 may refrain from performing a (second) radio signal scan at a (second) frequency (or frequencies) that is/are not included in the known list of frequencies. This may be based at least in part on determining that a (second) frequency (or frequencies) specified in the cell information 106 as being associated with a geolocation 110 corresponding to the current GPS location of the mobile device 102 is/are not included in the known list of frequencies. For example, the logic of the mobile device 102 may determine that a cell 100 associated with a frequency of 1700 MHz is expected to be at its present location, but if the known list of frequencies that the serving cell 100 will ask for does not include a frequency of 1700 MHz, the mobile device 102 may refrain from performing a radio signal scan at a frequency of 1700 MHz, since the mobile device 102 knows that the serving cell 100 will not ask for measurement information regarding the 1700 MHz frequency.

Figure 8:
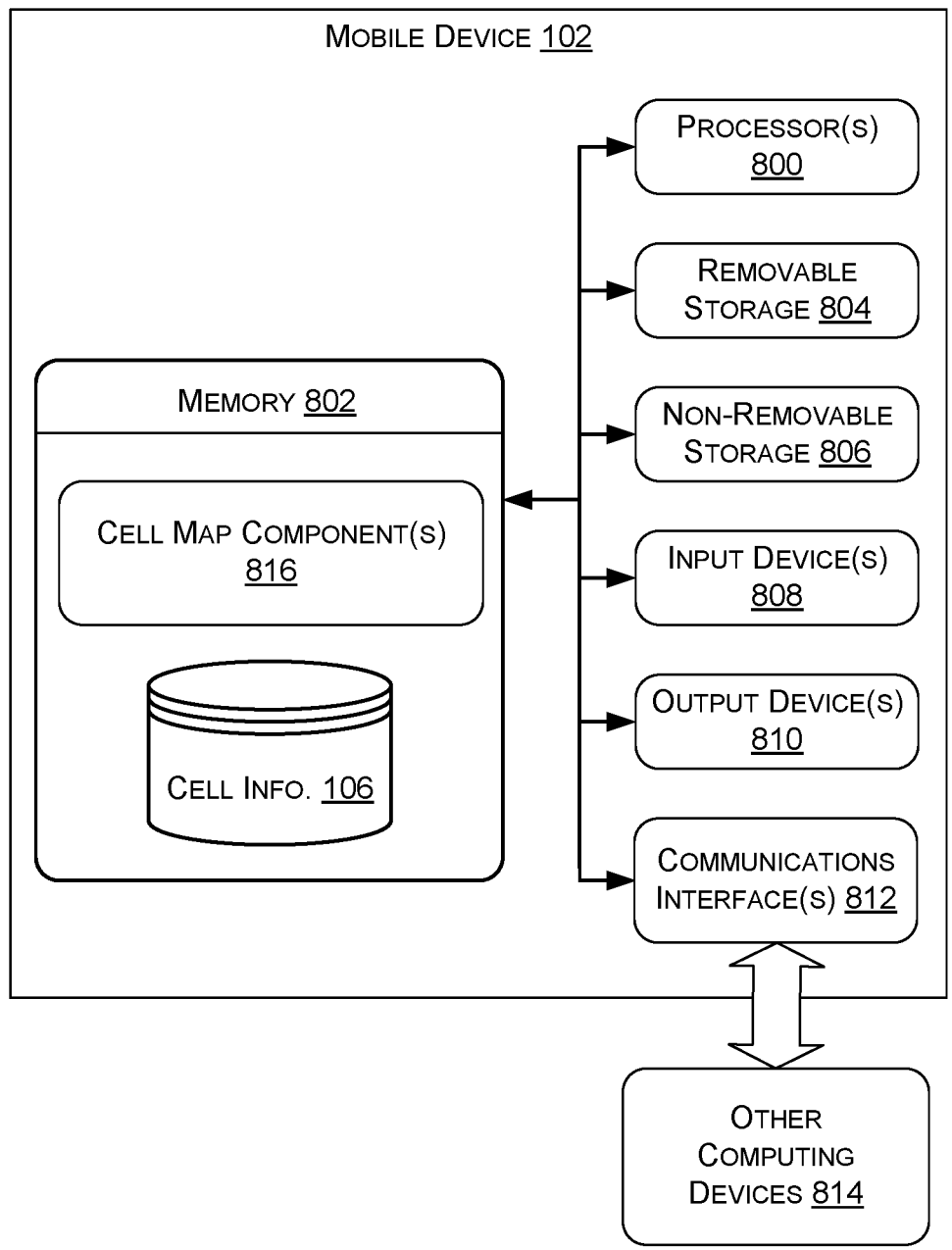
FIG. 8 is a block diagram of an example mobile device architecture in accordance with various embodiments.

FIG. 8 is a block diagram of an example architecture of the mobile device 102 in accordance with various embodiments. As shown, the mobile device 102 may include one or more processors 800 and one or more forms of computer-readable memory 802. The mobile device 102 may also include additional storage devices. Such additional storage may include removable storage 804 and/or non-removable storage 806.

In various embodiments, the computer-readable memory 802 is non-transitory and can include both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The non-transitory computer-readable memory 802 may also be described as computer storage media and may include volatile and nonvolatile, removable and non-removable media implemented in any method or technology for storage of information, such as computer readable instructions, data structures, program modules, or other data. Computer-readable memory 802, as well as the removable storage 804 and non-removable storage 806, are all examples of non-transitory computer-readable storage media, and some or all of the memory 802, the removable storage 804, and/or the non-removable storage 806 may constitute the local memory 218 of the mobile device 102, as described herein. Non-transitory computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the mobile device 102. Any such non-transitory computer-readable storage media may be part of the mobile device 102.

The mobile device 102 may further include one or more input devices 808, including, without limitation, a touch screen (e.g., touch, or proximity-based) display, physical buttons (e.g., keyboard or keypad), a camera-based sensor configured to receive gestural input from a user, a microphone or microphone array for receiving voice input commands from a user, pointing devices (e.g., mouse, pen, stylus, etc.), or any other suitable input devices 808 coupled communicatively to the processor(s) 800 and the computer-readable memory 802. The mobile device 102 may further include one or more output devices 810, including, without limitation, a display, one or more light-emitting diode (LED) indicators, speakers, a printer, or any other suitable output device coupled communicatively to the processor(s) 800 and the computer-readable memory 802.

The mobile device 102 may further include communications interface(s) 812 that allow the mobile device 102 to communicate with other computing devices 814 such as via a network (e.g., a cellular network, a radio air interface, etc.). The communications interface(s) 812 may facilitate transmitting and receiving wireless signals over any suitable wireless communications/data technology, standard, or protocol, as described above, such as using licensed, semi-licensed, or unlicensed spectrum over a telecommunications network. For example, the communication interface(s) 812 may represent at least one cellular radio (or cellular radio chip/chipset), at least one wireless IEEE 802.1x-based radio interface (e.g., a WiFi radio chip/chipset), as well as other types of wireless (e.g., Bluetooth®) and wireline communications interfaces.

In some embodiments, the computer-readable memory 802 may include a cell map component(s) 816 configured to receive or otherwise obtain, store, and utilize, cell information 106 stored in the memory 802 (and/or in the removable storage 804 and/or the non-removable storage 806). The use of this cell information 106 is described throughout this disclosure. In general, the cell map component(s) 816 represents logic (e.g., hardware, software, and/or firmware) and/or computer-executable instructions stored in the memory 802 and executable by the processor(s) 800 to perform operations described herein. It is to be appreciated that the cell map component(s) 816 may include functionality for performing any of the other techniques and functionality described herein with respect to the mobile device 102, such as the radio signal scans that are performed at various frequencies, via the communication interface(s) 812, to discover available cells 100 within communication range of the mobile device 102. For example, a WiFi radio chip may be used by the cell map component(s) 816 to scan for WiFi cells within communication range of the mobile device 102, a cellular radio chip may be utilized to scan for cellular-based cells, such as base stations, eNB cells, gNB cells, etc.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A computer-implemented method comprising:
    accessing cell information that is stored in memory of a mobile device, the cell information including a known list of frequencies to include in a measurement report;
    determining that a current Global Positioning System (GPS) location of the mobile device matches a geolocation specified in the cell information;
    determining and from the cell information, a first frequency associated with a cell that has been observed from the geolocation;
    performing a first radio signal scan at the first frequency to measure a signal strength of a radio signal from the cell based at least in part on the first frequency being included in the known list of frequencies, wherein the performing of the first radio signal scan occurs in response to a one or more criteria being satisfied, the one or more criteria comprising at least one of:
    determining that the mobile device is in idle mode, or
    determining that network bandwidth consumption of the mobile device is less than or equal to a threshold network bandwidth consumption value;
    refraining from performing a second radio signal scan at a second frequency based at least in part on determining that the second frequency is not included in the known list of frequencies; and
    storing in the memory of the mobile device, measurement information that includes at least the signal strength.

2. The computer-implemented method of claim 1, further comprising receiving an instruction from a serving cell to return a measurement report to the serving cell, wherein the serving cell is a E-UTRAN Node B (eNB) cell, and wherein the cell is a Next Generation Node B (gNB) cell.

3. The computer-implemented method of claim 1, the method further comprising after storing the measurement information:
    receiving, by the mobile device, an instruction from a serving cell to return a measurement report to the serving cell;
    accessing, by the mobile device, the measurement information from the memory of the mobile device; and
    sending, by the mobile device, the measurement information to the serving cell.

4. The computer-implemented method of claim 1, wherein the cell information further includes the second frequency associated with a second cell that has been observed from the geolocation, the method further comprising updating, by the mobile device, the cell information to indicate an unavailability of the second cell at the geolocation.

5. The computer-implemented method of claim 1, further comprising:
    determining, by the mobile device, that a second cell is within communication range of the mobile device based at least in part on the first radio signal scan;
    determining, by the mobile device, that the cell information stored in the memory of the mobile device does not associate a cell identifier of the second cell with the geolocation; and
    updating, by the mobile device, the cell information to indicate an availability of the second cell at the geolocation.

6. The computer-implemented method of claim 5, wherein the updated cell information includes a timestamp associated with the determining that the second cell is within communication range of the mobile device.

7. The computer-implemented method of claim 1, wherein the accessing of the cell information stored in the memory of the mobile device occurs in response to a trigger event comprising at least one of:
    passage of a predetermined amount of time;
    determining that the mobile device has attached to a serving cell;
    determining that the mobile device has moved a distance that is greater than or equal to a threshold distance since previously accessing the cell information;
    determining that the mobile device has transitioned from a powered-off state to a powered-on state; or
    determining that the mobile device has transitioned from an airplane mode to a cellular communication mode.

8. The computer-implemented method of claim 1, wherein the performing of the first radio signal scan further occurs in response to a one or more criteria being satisfied, the one or more criteria comprising at least one of:
    determining that the mobile device is in idle mode;
    determining that network bandwidth consumption of the mobile device is less than or equal to a threshold network bandwidth consumption value; or
    determining that processing resource consumption of the mobile device is less than or equal to a threshold processing resource consumption value.

9. The computer-implemented method of claim 1, further comprising, prior to the accessing of the cell information stored in the memory of the mobile device:
    sending, by the mobile device to a remote system, a request for the cell information, the request including location associated with the mobile device or with a user account of a user of the mobile device;

receiving, by the mobile device, the cell information from the remote system, the cell information including at least the frequency associated with the cell; and storing, by the mobile device, the cell information in memory of the mobile device.

10. A mobile device comprising:

a processor; and memory storing:

cell information about cells in a geographical area, the cell information including, for a geolocation within the geographical area, at least a first frequency associated with a cell; and computer-executable instructions that, when executed by the processor, cause the mobile device to perform operations comprising:

accessing the cell information that is stored in memory of the mobile device, the cell information including a known list of frequencies to include in a measurement report;

determining that a current Global Positioning System (GPS) location of the mobile device matches a geolocation specified in the cell information;

determining, from the cell information, the first frequency associated with the cell that has been observed from the geolocation;

performing a first radio signal scan at the first frequency to measure a signal strength of a radio signal from the cell based at least in part on the first frequency being included in the known list of frequencies, wherein the performing of the first radio signal scan occurs in response to a one or more criteria being satisfied, the one or more criteria comprising at least one of:

determining that the mobile device is in idle mode, or determining that network bandwidth consumption of the mobile device is less than or equal to a threshold network bandwidth consumption value;

refraining from performing a second radio signal scan at a second frequency based at least in part on determining that the second frequency is not included in the known list of frequencies; and storing in the memory of the mobile device, measurement information that includes at least the signal strength.

11. The mobile device of claim 10, the actions further comprising receiving an instruction from a serving cell to return a measurement report to the serving cell, wherein the serving cell is a first Next Generation Node B (gNB) cell, and wherein the cell is a second gNB cell that is different from the first gNB cell.

12. The mobile device of claim 10, wherein the signal strength comprises at least one of a reference signal received power (RSRP) parameter or a reference signal received quality (RSRQ) parameter.

13. The mobile device of claim 10, wherein the cell information further includes the second frequency associated with a second cell that has been observed from the geolocation, the operations further comprising updating the cell information to indicate an unavailability of the second cell at the geolocation.

14. The mobile device of claim 10, the operations further comprising:

determining that a second cell is within communication range of the mobile device based at least in part on the first radio signal scan;

determining that the cell information stored in the memory does not associate a cell identifier of the second cell with the geolocation; and updating the cell information to indicate an availability of the second cell at the geolocation.

15. The mobile device of claim 10, wherein the performing of the first radio signal scan occurs in response to a one or more criteria being satisfied, the one or more criteria comprising at least one of:

determining that the mobile device is in idle mode;

determining that network bandwidth consumption of the mobile device is less than or equal to a threshold network bandwidth consumption value; or determining that processing resource consumption of the mobile device is less than or equal to a threshold processing resource consumption value.

16. A system comprising:

a mobile device comprising:

computer-implemented method comprising:

a processor; and memory computer-executable instructions that, when executed by the processor, cause the mobile device to perform operations comprising:

accessing cell information that is stored in memory of the mobile device, the cell information including a known list of frequencies to include in a measurement report;

determining that a current Global Positioning System (GPS) location of the mobile device matches a geolocation specified in the cell information;

determining and from the cell information, a first frequency associated with a cell that has been observed from the geolocation;

performing a first radio signal scan at the first frequency to measure a signal strength of a radio signal from the cell based at least in part on the first frequency being included in the known list of frequencies, wherein the performing of the first radio signal scan occurs in response to a one or more criteria being satisfied, the one or more criteria comprising at least one of:

determining that the mobile device is in idle mode, or determining that network bandwidth consumption of the mobile device is less than or equal to a threshold network bandwidth consumption value;

refraining from performing a second radio signal scan at a second frequency based at least in part on determining that the second frequency is not included in the known list of frequencies; and storing in the memory of the mobile device, measurement information that includes at least the signal strength.

17. The system of claim 16, wherein the cell information further includes the second frequency associated with a second cell that has been observed from the geolocation, the operations further comprising updating, by the mobile device, the cell information to indicate an unavailability of the second cell at a geolocation that corresponds to a current Global Positioning System (GPS) location of the mobile device.

18. The system of claim 16, the operations further comprising:

determining, by the mobile device, that a second cell is within communication range of the mobile device based on the first radio signal scan;

determining, by the mobile device, that the cell information stored in the memory of the mobile device does not associated a cell identifier of the second cell with a geolocation that corresponds to a current Global Positioning System (GPS) location of the mobile device; and updating, by the mobile device, the cell information to indicate an availability of the second cell at the geolocation.

19. The system of claim 16, wherein the performing of the first radio signal scan occurs in response to a one or more criteria being satisfied, the one or more criteria comprising at least one of:
   determining that the mobile device is in idle mode;
   determining that network bandwidth consumption of the mobile device is less than or equal to a threshold network bandwidth consumption value; or
   determining that processing resource consumption of the mobile device is less than or equal to a threshold processing resource consumption value.

20. The system of claim 16, the operations further comprising, after storing the measurement information:
   receiving, by the mobile device, an instruction from a serving cell to return a measurement report to the serving cell;
   accessing, by the mobile device, the measurement information from the memory of the mobile device; and
   sending, by the mobile device, the measurement information to the serving cell.

* * * * *